(12) United States Patent
Gordon-Clements

(10) Patent No.: US 6,523,306 B1
(45) Date of Patent: Feb. 25, 2003

(54) SEEDING CONTAINER

(76) Inventor: Rhonda Gordon-Clements, P.O. Box 121, Montague, Prince Edward Island (CA), C0A 1R0

( * ) Notice: Subject to any disclaimer, the term of this patent is extended or adjusted under 35 U.S.C. 154(b) by 0 days.

(21) Appl. No.: 09/543,324

(22) Filed: Apr. 5, 2000

(30) Foreign Application Priority Data

Apr. 9, 1999 (CA) .............................................. 2268422

(51) Int. Cl.[7] .............................................. A01G 23/02
(52) U.S. Cl. ................. 47/73; 47/65.8; 47/72; 47/74; 47/77; 229/4.5; 229/93; 229/87.01; 426/138; 426/410; 493/273; 224/906; 206/423
(58) Field of Search ................... 47/72, 41.01, 65.7, 47/29.7, 65.8, 73, 74, 77, 85; 206/423; D9/305; 28/147; 229/87.01, 4.5, 93; 383/70, 94, 98, 120, 82, 83; 493/186, 273; 224/906; 426/138, 410

(56) References Cited

U.S. PATENT DOCUMENTS

| | | | |
|---|---|---|---|
| 126,641 A | 5/1872 | Mabbitts, Jr. | |
| 404,585 A | 6/1889 | Wright | |
| 536,895 A | 4/1895 | Richards | |
| 564,375 A | 7/1896 | Greenough | |
| 786,547 A | 4/1905 | Chamberlin | |
| 934,266 A * | 9/1909 | Bartlett | |
| 988,453 A * | 4/1911 | Forney | 229/405 |
| 1,187,397 A * | 6/1916 | Southard | 47/73 |
| 1,352,756 A | 9/1920 | Levy | |
| 1,357,523 A | 11/1920 | Schindler | |
| 1,363,196 A * | 12/1920 | Howard | 383/101 |
| 1,499,218 A | 6/1924 | Hoover | |
| 1,503,183 A | 7/1924 | Bailey | |
| 1,828,448 A | 10/1931 | Seidel | |
| 1,988,886 A * | 1/1935 | Wilson | 206/423 |
| 2,009,511 A * | 7/1935 | Nydegger | 206/527 |
| 2,014,477 A * | 9/1935 | Lee | |
| 2,033,627 A | 3/1936 | Gardner | |
| 2,079,116 A | 5/1937 | Gardner | |
| 2,224,504 A * | 12/1940 | Milmoe | 206/446 |
| 2,290,117 A * | 7/1942 | Mulford | |
| 2,438,198 A | 3/1948 | Barnett | |
| 2,766,553 A * | 10/1956 | Wedge | 156/190 |
| 2,915,098 A * | 12/1959 | McRay et al. | 383/120 |
| 3,094,810 A * | 6/1963 | Kalpin | 383/103 |
| 3,352,085 A * | 11/1967 | Pantenburg | 229/87.01 |
| 4,006,561 A * | 2/1977 | Thoma et al. | 206/423 |
| 4,176,700 A * | 12/1979 | Mettler et al. | 229/156 |
| 4,850,528 A * | 7/1989 | Hanus | 229/138 |
| 4,860,893 A * | 8/1989 | Kaufman | 206/390 |
| 5,098,012 A * | 3/1992 | Will | 206/548 |
| 5,501,059 A | 3/1996 | Weder et al. | |
| 5,557,881 A | 9/1996 | Boludin et al. | |
| 5,935,686 A * | 8/1999 | Daelmans et al. | 206/524.1 |
| 6,423,357 B1 * | 7/2002 | Woods et al. | 426/138 |

FOREIGN PATENT DOCUMENTS

| | | | |
|---|---|---|---|
| GB | 563552 | 8/1944 | |
| JP | 406113681 A * | 4/1994 | A10G/9/10 |

* cited by examiner

Primary Examiner—Peter M. Poon
Assistant Examiner—Andrea M. Valenti
(74) Attorney, Agent, or Firm—Palmer C. DeMeo; Mario Theriault

(57) ABSTRACT

The cylindrical container is made of paper and has a rim, a seam along the vertical dimension thereof and an overlap in that seam. The bottom end of the container has a twisted and flattened tuft of paper. A fold is provided around the rim. This fold encloses the overlap crosswise for retaining the shape of the container. The paper container is usable as a seedling pot. There is also provided a hand tool for manually forming these paper containers. This hand tool comprises a cylindrical body having a diameter, a closed end and an open end, and a handle mounted to the closed end. The hand tool also has a cavity extending inside the cylindrical body from the open end, where the tuft of paper is pushed in during the forming of the bottom end of the container. There is also provided a method for forming paper containers using the hand tool.

10 Claims, 2 Drawing Sheets

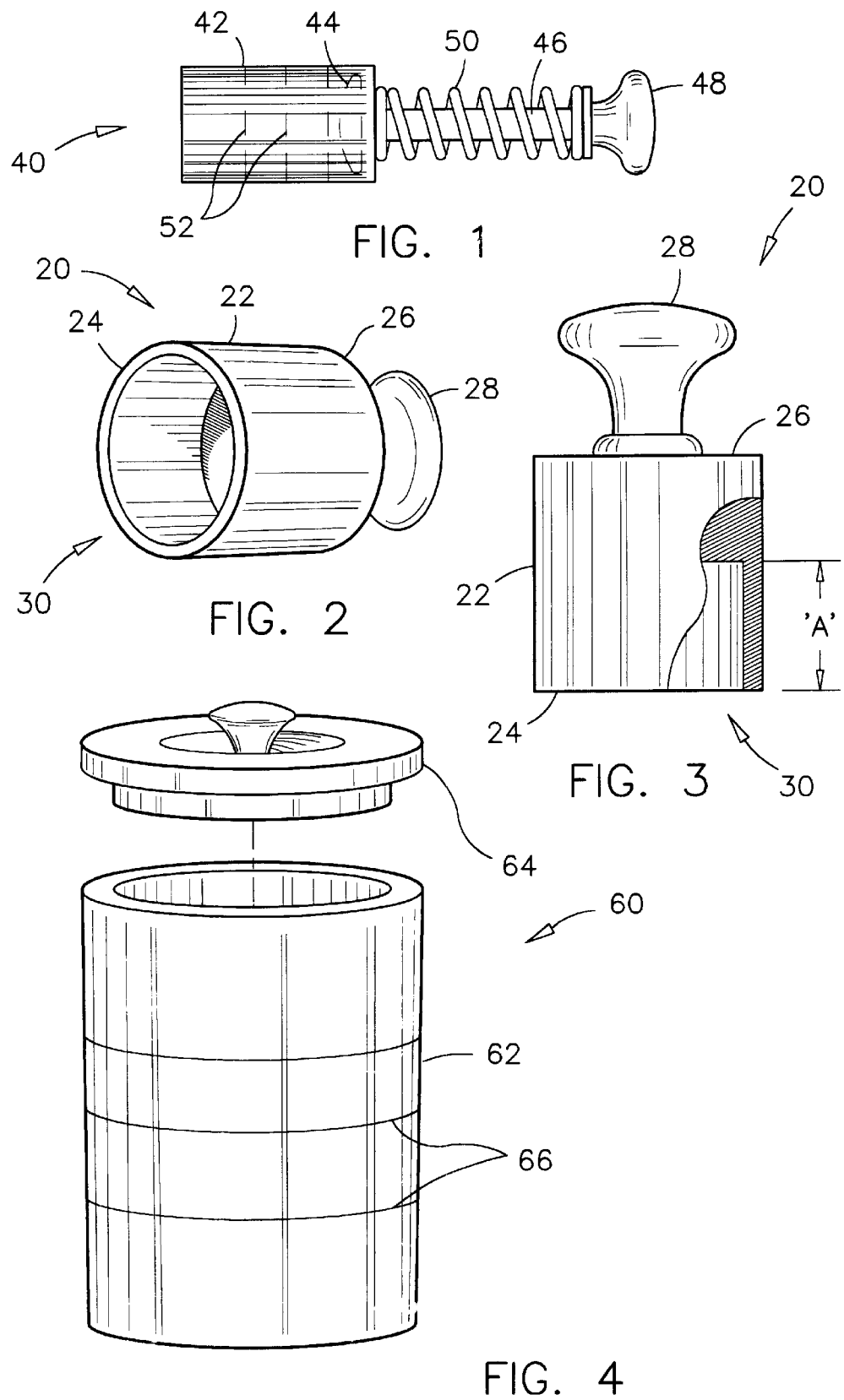

SEEDING CONTAINER

FIELD OF THE INVENTION

The present invention relates to cylindrical paper containers, to hand tools and methods for making cylindrical paper containers, and more particularly, it relates to the making of horticulture-type seedling pots.

BACKGROUND OF THE INVENTION

In commercial silviculture operations, in greenhouses as well as in hobby gardening, plants are commonly germinated and grown to show a few leaves before they are transplanted in a real soil. Plants are generally started in seedling pots made of peat moss, pressed fibres, papier-mâché, or other biodegradable material such that the containers containing the seedlings are normally transplanted with the plant and let in the ground to disintegrate and to add to the fibre content of the soil about the root system of the plant.

Seedling pots are typically found in gardening supply stores, and are relatively expensive. Also, it is common that when comes the planting time, one has not purchased a sufficient quantity of pots for the amount of seeds that one ultimately wants to plant. The hand tool and method of the present invention are advantageous in that one can use newsprint, paper or other types of sheet material to readily and inexpensively manufacture seedling pots that meet the requirements of common plant species.

A number of paper containers have been developed in the past to germinate seeds. Examples of these containers are described in the following documents:

U.S. Pat. No. 404,585, issued on Jun. 4, 1889 to W. L. Wright;
U.S. Pat. No. 1,828,448, issued on Oct. 20, 1931 to G. M. Seidel;
U.S. Pat. No. 2,033,627, issued on Mar. 10, 1936 to C. E. Gardner;
U.S. Pat. No. 2,079,116, issued on May 4, 1937 to C. E. Gardner;
GB Patent 563,552, issued on Aug. 18, 1944 to E. A. Ingold.

Although the containers of the prior art deserve undeniable merits, it is believed that the prior inventions do not suggest any tool nor a method for easily forming cylindrical paper seedling pots by hand, without using adhesive or other fastener. As such, it will be appreciated that there continues to be a need for a simple hand tool and a method, which can be used by professional growers as well as by the hobby gardeners, for easily making seedling pots of various sizes and thicknesses, using paper material as common as newsprint.

SUMMARY OF THE INVENTION

The present invention provides for a hand tool and a method for manually making cylindrical paper containers that have overlapping and interlocking flaps, stiff rims, selective thicknesses and strong bottom structures. Furthermore, the containers according to the present invention retain their shape without tape, adhesive or other fastener.

Broadly, in a first aspect of the present invention, there is provided a hand tool for forming cylindrical paper containers. This hand tool comprises a cylindrical body having a diameter, a closed end and an open end, and a handle mounted on the closed end. The hand tool also has a cavity extending inside the cylindrical body from the open end.

The hand tool according to this aspect of the present invention is particularly appreciable for use with sheet material for easily and quickly forming cylindrical containers. The sheet material can be wrapped around the cylindrical body and a portion of the sheet material near the open end of the cylindrical body can be twisted, tufted up and pushed inside the cavity for forming a cylindrical container having a closed and relatively flat bottom end.

In accordance with another aspect of the present invention, there is provided a cylindrical container made of sheet material and comprising an open end, a bottom end, a rim circling the open end, a vertical dimension and a seam along the vertical dimension. The seam comprises an overlap in the sheet material. The bottom end comprises a twisted, tufted and flattened portion of the sheet material. The cylindrical container also has a fold around the rim, and this fold encloses the overlap crosswise for retaining the overlap and retaining the shape of the container. One of the advantageous features of this cylindrical container is that a sturdiness thereof is obtained without adhesive nor fastener.

In accordance with yet another aspect of the present invention, there is provided a method for manually forming a cylindrical paper container. This method comprises the steps of:

A) providing a hand tool comprising a cylindrical body having a length, a diameter, a closed end and an open end, a handle mounted to the closed end and a cavity extending inside the cylindrical body from the open end;
B) providing a rectangular sheet of paper having a height of about twice the length of the cylindrical body and a width of about one third more than a circumference of the cylindrical body;
C) forming a fold in the sheet of paper with a fold line extending across the width of the sheet;
D) cutting the fold along the height of the sheet in a third-region of the fold and unfolding a segment of the fold about the fold line;
E) placing the fold against the cylindrical body and aligning the fold line with the closed end of the cylindrical body;
F) wrapping the sheet of paper around the cylindrical body, with the width of the sheet of paper extending around the cylindrical body thereby forming a paper cylinder having an overlapped seam;
G) while holding the paper cylinder to the cylindrical body, twisting a portion of the sheet of paper extending beyond the cylindrical body and forming a tuft of paper with this portion;
H) pushing the tuft of paper inside the cavity in the cylindrical body, thereby defining a closed end to the paper cylinder;
I) pulling the hand tool from the paper cylinder, and
J) folding the segment of the fold about the fold line and over the overlapped seam to enclose the overlapped seam crosswise and to define an interlocking rim to that paper cylinder.

This method is advantageous for easily forming cylindrical paper containers by hand without adhesive nor fastener. The paper containers are formable with a simple tool and with readily available paper sheets. When the paper containers are used as seedling pots, the above method is particularly advantageous for fabricating the seedling pots as needed at the planting time, thereby partly eliminating inventories or conventional advance procurement of seedling supplies.

Still another feature of the invention is that the hand tool used to manufacture the seedling pots is susceptible of a low cost of manufacture with regard to materials and labour, and which accordingly is then susceptible of low price of sale to the industry, thereby making such hand tool economically available to the public.

Other advantages and novel features of the invention will become apparent from the following detailed description.

BRIEF DESCRIPTION OF THE DRAWINGS

A preferred embodiment of the present invention selected by way of an example will now be described with reference to the accompanying drawings in which:

FIG. 1 illustrates a first tool for making cylindrical containers of a relatively small diameter;

FIG. 2 is a perspective view of the preferred hand tool for making cylindrical containers of average diameter for use in common horticultural applications;

FIG. 3 illustrates a side view of the preferred hand tool for making cylindrical containers according to the preferred embodiment of the present invention;

FIG. 4 is a side perspective view of a second tool for making cylindrical containers having a relatively large diameter;

DETAILED DESCRIPTION OF THE PREFERRED EMBODIMENT

Figure 5:
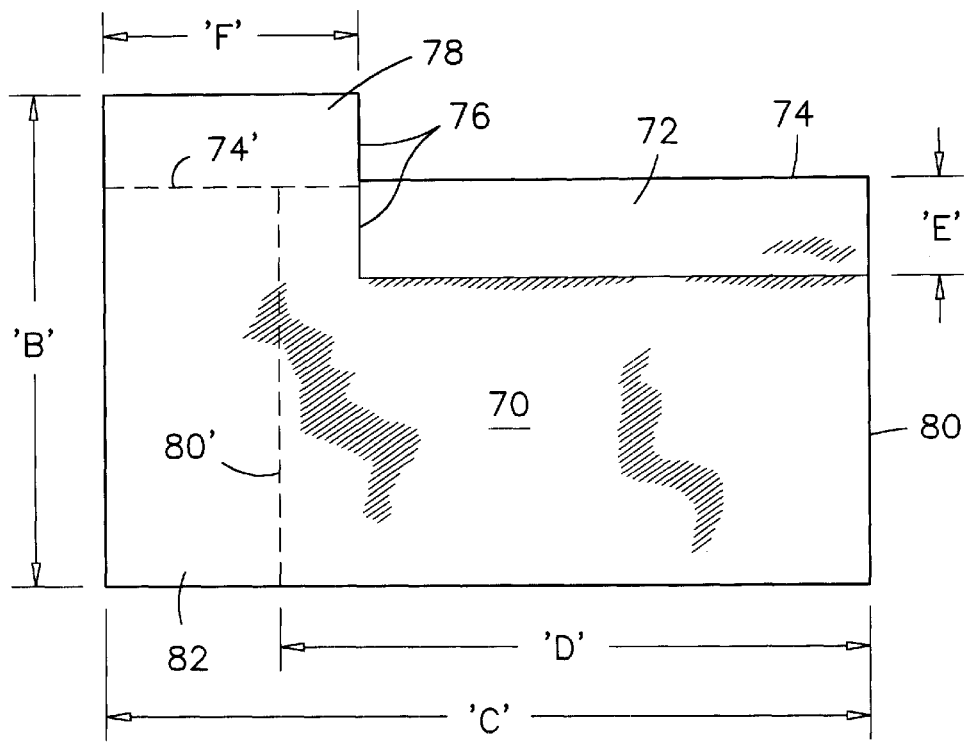
FIG. 5 illustrates a layout of a paper sheet used for making a cylindrical container according to the preferred embodiment of the present invention.

Although the preferred embodiment of this invention comprises cylindrical containers made of sheet material, the present invention also comprises a preferred method and a preferred hand tool for making these containers. It will be appreciated that this invention is susceptible of other embodiments in many various forms, and therefore the present disclosure is to be considered as an example of the principles of the invention and is not intended to limit the invention to the embodiment illustrated.

Reference will firstly be made to FIGS. 1 to 4 illustrating the preferred hand tool and two variants thereof for manually forming cylindrical containers according to the preferred embodiment of the present invention, often referred to herein as seedling pots. Although seedling pots are mentioned throughout this description of the preferred embodiment, it will be appreciated that a variety of other cylindrical containers are manufacturable using the tools and method described herein.

The preferred hand tool is illustrated in FIGS. 2 and 3. This hand tool is hereinafter referred to as a mold 20, and comprises a cylindrical hollow body 22 with an opened end 24, a closed end 26 and a knob handle 28 mounted to the closed end 26. The depth 'A' of the cavity 30 inside the body 22 is about half of the diameter of the body. In the preferred hand tool, the depth 'A' is about ⅞ inch (22 mm), and the diameter of the cylindrical body is about 1¾ inches (44 mm). The mold 20 is preferably made of wood, plastic or similar rigid material.

A first variant 40 of the mold 20 comprises a tubular member 42 having a piston 44 mounted therein. The piston 44 is connected to a rod 46 and the rod is connected to a knob 48. The piston 44 is urged toward the closed end of the tubular member by a spring 50 mounted over the rod 46. The tubular member 42 is preferably made of transparent material and preferably has spaced-apart lines 52 printed thereon. The lines 52 are advantageous for providing guiding marks for forming containers of various depths as will be explained later. This first variant 40 of the tool is advantageous for simultaneously forming a seedling pot over the tubular member 42 that has been previously filled with planting soil, and for filling the seedling pot with the soil before withdrawing the formed pot from the tool. As one will appreciate, the piston 44 is also advantageous for assisting in the pushing out of the formed container from over the tubular member 42.

The tubular member 42 of the tool 40 in this variant is substantially smaller than the cylindrical body 22 of the preferred mold 20. The tool 40 of the first variant is intended to form silviculture-type paper pots for placement in common silviculture starting trays.

A second variant 60 of the preferred hand tool is shown in FIG. 4. The cylindrical mandrel 62 of this variant is substantially larger than the cylindrical body 22 of the mold 20. The mandrel of the second variant preferably has a diameter of about 4 inches (102 mm) and a height of about 6 inches (152 mm) for forming larger gardening-type planting pots for examples. The cylindrical mandrel 62 is preferably made of paperboard tubing. A rigid cap 64 made of wood, plastic or the like is also provided for covering one end of the mandrel 62, when soil or other plant growing media has been placed inside the mandrel 62 prior to forming a container thereon for example. As one can appreciate, the cap 64 is a removable cap such that potting soil may be introduced inside a container, while the container is still mounted to the mandrel 62. Circumferential guide lines 66 are also provided on the mandrel 62 for assisting in forming containers of different depths.

It will also be appreciated that the features of one of the described variants are applicable to the other variant, and to the preferred mold 20, and vice-versa. In other words, the diameter of the preferred mold 20 may vary for example from 1 inch to 4 inches or more and the cylindrical body 22 may also have guide marks thereon.

Referring now to FIGS. 5–8, there is illustrated therein a preferred method for manufacturing cylindrical containers according to the preferred embodiment of the present invention. The base material for manufacturing the containers is any sheet material 70 and preferably newsprint, or another sheet of paper. One or more layers may be used according to the purpose and required strength of the container.

The sheet 70 is preferably cut to a height 'B' corresponding to at least about twice as much as the depth of the container to be formed. The width 'C' of the sheet 70 is preferably the circumference 'D' of the container to be formed plus at least about 30%. An overlap of at least about one third of the container is thereby provided for securely retaining growing media inside the container. It will be appreciated that the dimension of this overlap may vary according to the purpose of the container and the type of material to be contained inside the container.

A fold 72 is formed along the top edge of the sheet, for making a double thickness at top edge and reinforcing the rim 74 of the container being formed. The suggested height 'E' of this fold 72 is between about ¼ inch (6 mm) to 1½ inches (38 mm) for containers having diameters varying from 1 inch (25 mm) to 4 inches (102 mm) respectively. A portion of this fold 72 is cut or torn vertically at lines 76 and folded back straight up about the fold line 74', thereby forming a flap segment 78 extending above the rim 74 of the container to be formed. The width 'F' of the flap is preferably about one third or slightly more of the full width 'C' of the sheet 70, such that the starting vertical edge 80 of the sheet 70 coincides with approximately a central region 80' of the flap segment 78 when the container is formed.

Figures 6, 7, 8:
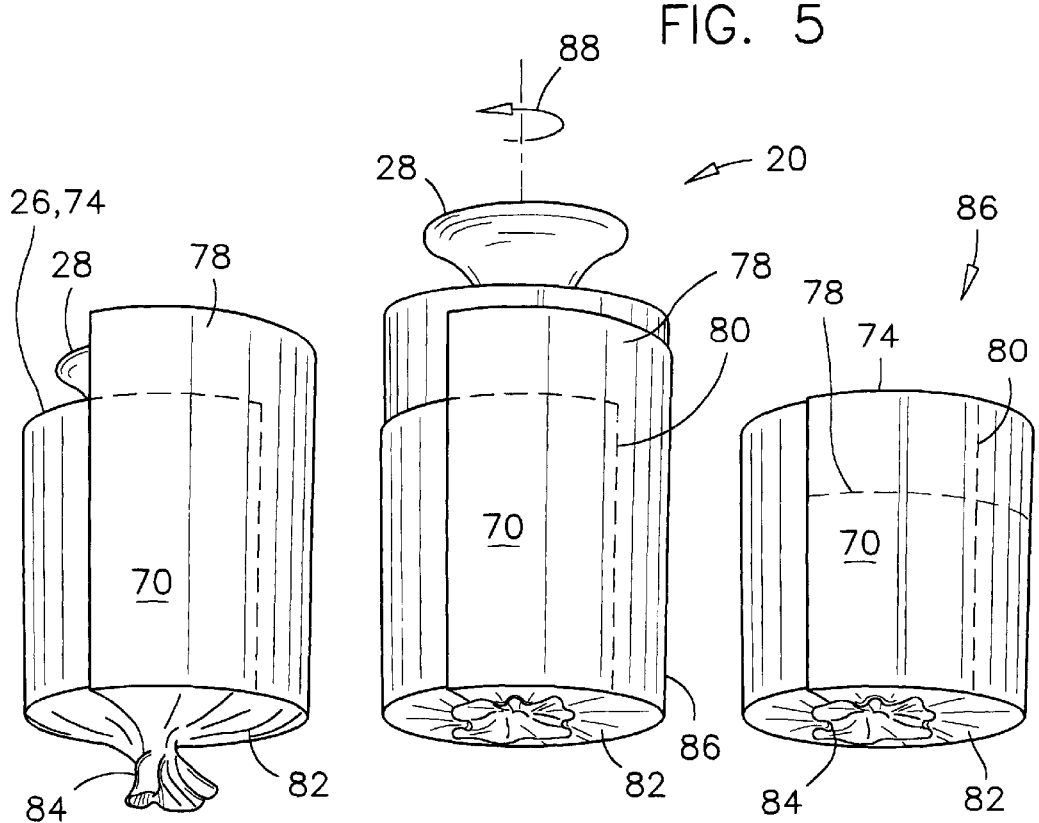
FIG. 6 illustrates one of the early steps in a preferred method for forming a cylindrical container according to the preferred embodiment of the present invention.
FIG. 7 illustrates an intermediate step in a preferred method for forming a cylindrical container according to the preferred embodiment of the present invention.
FIG. 8 illustrates a final step in a preferred method for forming a cylindrical container according to the preferred embodiment of the present invention.

The forming of a container according to the preferred embodiment is illustrated in FIGS. 6–8. The sheet 70 is wrapped around the mold 20, with the top edge 74, or the rim of the sheet aligned with the closed end 26 of the mold 20. When using a mold having guide lines printed thereon, the top edge 74 may be aligned with one of the guide lines according to the required depth of the container. The sheet 70 is wrapped and held tight around the mold 20, with the starting vertical edge 80 set against the cylindrical body, straight along the height of the mold 20.

The bottom edge 82 of the sheet extending beyond the cylindrical body 22 is then pinched and twisted. The twisted tuft 84 is pushed into the cavity 30 of the mold and flattened even with the bottom edge 82 of the container as shown in FIGS. 6 and 7. The dimension 'A' mentioned above has been found to be convenient for receiving the twisted tuft of material on the bottom of the container made with the mold 20.

The mold 20 is then twisted out of the formed container 86, as shown by arrow 88 in FIG. 7, while holding the container 86 in one's hand. The arrow 88 shows a twisting motion in the direction of the wrapping of the sheet, which direction tends to expand the container 86 to facilitate the removal of the mold 20 therefrom.

At this stage, the flap segment 78 is folded inside the container to overlap the vertical edge 80, to overlap the fold 72, to reinforce the rim member 74 and to prevent the container from opening out of shape. The container 86 thus formed is relatively sturdy, has good circumferential strength, can be set straight on a flat surface and can be used for a multitude of applications including the planting of seeds.

The container 86 according to the preferred embodiment does not contain metal fastener or adhesive. When the container 86 is made with newsprint or uncoated paper for example, it is entirely biodegradable and is particularly advantageous for applications requiring a single use.

While one embodiment of the present invention has been described herein above, it will be appreciated by those skilled in the art that various modifications, alternate materials, shapes and equivalents may be employed without departing from the true spirit and scope of the invention. For instance, while commercial paper muffin cups are known to work well with traditional muffin recipes, the low fat recipes tend to stick to the paper making the liners difficult to remove. Using the readily available baking parchment and the hand tool according to the preferred embodiment, non-stick muffin pots can be fabricated and will not stick even if no fat is used. Similarly, it will be appreciated that various edible pots can be made using pastry doughs. One such method comprises the cutting of phyllo pastry to the required size and the laying of three layers over one other, each brushed with butter. The container is formned using the mold and the folding instructions described herein. The container is baked to give a strong edible pot which can be filled with anything from ice cream to stew. Other sheet materials from which containers may be made using the mold and method described herein comprise edible rice paper and edible sheet materials such as spinach or cabbage leaves. The craft industry may also benefit for the tool and method described herein. For example, it will be appreciated that sheet materials can be used with the tools according to the present invention for making gift boxes, ornaments and candle molds.

Therefore, the above description and illustrations should not be construed as limiting the scope of the invention which is defined by the appended claims.

I claim:

1. A cylindrical container made of sheet material without an adhesive or metal fastener, said container comprising:
    a diameter, an open end, a closed bottom end, a rim circling said open end, an inward fold around said rim, a vertical dimension and a seam along said vertical dimension;
    said seam comprising a vertical edge and an overlap in said sheet material,
    said fold having a cut therein along said vertical dimension adjacent said seam; said cut defining a flap segment in said fold; and said flap segment overlapping said fold and straddling said vertical edge.

2. The cylindrical container as claimed in claim 1, wherein said overlap represents about one third of a circumference thereof.

3. The cylindrical container as claimed in claim 1, wherein said diameter is between about 1 inch and about 4 inches and a height of said fold is between about ¼ inch to about 1½ inches.

4. The cylindrical container as claimed in claim 1, wherein a length of said flap segment is about twice as much as a width of said overlap.

5. The cylindrical container as claimed in claim 1, wherein a height of said sheet material is about twice as long as said vertical dimension.

6. The cylindrical container as claimed in claim 1, wherein said sheet material comprises several layers of paper.

7. The cylindrical container as claimed in claim 1, wherein said closed bottom end comprises a twisted and flattened tuft of said sheet material.

8. The cylindrical container as claimed in claim 1, wherein said sheet material is baking parchment.

9. The cylindrical container as claimed in claim 1, wherein said sheet material is pastry dough.

10. The cylindrical container as claimed in claim 1, wherein said sheet material comprises a cabbage leave.

* * * * *